(12) United States Patent
Vaddadi et al.

(10) Patent No.: US 8,706,711 B2
(45) Date of Patent: Apr. 22, 2014

(54) DESCRIPTOR STORAGE AND SEARCHES OF K-DIMENSIONAL TREES

(75) Inventors: Sundeep Vaddadi, San Diego, CA (US); Onur C. Hamsici, La Jolla, CA (US); John H. Hong, San Diego, CA (US); Yuriy Reznik, Seattle, WA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 13/340,024

(22) Filed: Dec. 29, 2011

(65) Prior Publication Data

US 2012/0330967 A1      Dec. 27, 2012

Related U.S. Application Data

(60) Provisional application No. 61/500,059, filed on Jun. 22, 2011.

(51) Int. Cl.
*G06F 17/30* (2006.01)

(52) U.S. Cl.
USPC .......................................... 707/706; 707/797

(58) Field of Classification Search
USPC ................................ 707/706, 797
See application file for complete search history.

(56) References Cited

U.S. PATENT DOCUMENTS

| | | | |
|---|---|---|---|
| 5,819,258 A | 10/1998 | Vaithyanathan et al. | |
| 6,134,541 A | 10/2000 | Castelli et al. | |
| 6,347,313 B1 | 2/2002 | Ma et al. | |
| 6,400,996 B1 | 6/2002 | Hoffberg et al. | |
| 6,446,068 B1 | 9/2002 | Kortge | |
| 6,711,293 B1 | 3/2004 | Lowe | |
| 7,006,714 B2 | 2/2006 | Kasutani | |
| 7,216,129 B2 | 5/2007 | Aono et al. | |
| 7,263,205 B2 | 8/2007 | Lev | |
| 7,447,362 B2 | 11/2008 | Lev | |

(Continued)

FOREIGN PATENT DOCUMENTS

| EP | 1383072 A1 | 1/2004 |
|---|---|---|
| EP | 2015227 A2 | 1/2009 |

(Continued)

OTHER PUBLICATIONS

Sumakwel Muralla, "A Method of accelerating K-means by directed perturbation of the codevectors", dated Jun. 25, 2006, pp. 15, 17-19 and 49.

(Continued)

*Primary Examiner* — Hung Q Pham

(74) *Attorney, Agent, or Firm* — Kilpatrick Townsend & Stockton LLP

(57) ABSTRACT

Various arrangements for using a k-dimensional tree for a search are presented. A plurality of descriptors may be stored. Each of the plurality of descriptors stored is linked with a first number of stored dimensions. The search may be performed using the k-dimensional tree for one or more query descriptors that at least approximately match one or more of the plurality of descriptors linked with the first number of stored dimensions. The k-dimensional tree may be built using the plurality of descriptors wherein each of the plurality of descriptors is linked with a second number of dimensions when the k-dimensional tree is built. The second number of dimensions may be a greater number of dimensions than the first number of stored dimensions.

31 Claims, 7 Drawing Sheets

(56) References Cited

U.S. PATENT DOCUMENTS

| | | |
|---|---|---|
| 7,508,954 B2 | 3/2009 | Lev |
| 7,539,657 B1 | 5/2009 | Liu et al. |
| 7,551,782 B2 | 6/2009 | Lev |
| 7,575,171 B2 | 8/2009 | Lev |
| 7,672,939 B2 | 3/2010 | Burges |
| 7,725,484 B2 | 5/2010 | Nister et al. |
| 7,860,317 B2 | 12/2010 | Xie et al. |
| 7,903,883 B2 | 3/2011 | Zitnick, III |
| 7,921,169 B2 | 4/2011 | Jacobs et al. |
| 8,276,088 B2 | 9/2012 | Ke et al. |
| 2002/0019819 A1 | 2/2002 | Sekiguchi et al. |
| 2005/0259884 A1 | 11/2005 | Murakami et al. |
| 2005/0285764 A1 | 12/2005 | Bessette et al. |
| 2007/0198568 A1 | 8/2007 | Luo et al. |
| 2008/0034396 A1 | 2/2008 | Lev |
| 2008/0177764 A1 | 7/2008 | Kise et al. |
| 2009/0017765 A1 | 1/2009 | Lev |
| 2009/0132487 A1 | 5/2009 | Lev |
| 2009/0147990 A1 | 6/2009 | Lev |
| 2009/0282025 A1 | 11/2009 | Winter et al. |
| 2010/0070989 A1 | 3/2010 | Lev |
| 2010/0131714 A1 | 5/2010 | Chandrasekaran |
| 2010/0149322 A1 | 6/2010 | Lev |
| 2010/0166339 A1 | 7/2010 | Gokturk et al. |
| 2010/0268733 A1 | 10/2010 | Hayaishi et al. |
| 2011/0314031 A1* | 12/2011 | Chittar et al. ............... 707/749 |
| 2012/0027290 A1 | 2/2012 | Baheti et al. |
| 2012/0110025 A1 | 5/2012 | Reznik |
| 2012/0117122 A1* | 5/2012 | Wang et al. ................ 707/797 |
| 2012/0263388 A1 | 10/2012 | Vaddadi et al. |

FOREIGN PATENT DOCUMENTS

| | | |
|---|---|---|
| EP | 2284791 A1 | 2/2011 |
| WO | WO0034893 A1 | 6/2000 |
| WO | WO0221529 A1 | 3/2002 |
| WO | WO2008045521 A2 | 4/2008 |
| WO | WO2010141474 A1 | 12/2010 |
| WO | WO2010141926 A1 | 12/2010 |

OTHER PUBLICATIONS

Alexandrina Rogozan : "UV Theorie de l'Information", May 25, 2008, pp. 1-12, XP55026473, Retrieved from the Internet: URL:http://asi.insa-rouen.fr/enseignement/ siteUV/ti/private/Cours5TI.pdf [retrieved on May 8, 2012].

Ananth Grama: "Trees", Data structures course slides, Jan. 3, 2001 (2001-01-83), pp. 1-18, XP55026471, http://www.cs.purdue.edu/homes/ayg/CS251/slides/ Retrieved from the Internet: URL:http://www.cs.purdue.edu/homes/ayg/CS251/slides/chap5.pdf [retrieved on May 8, 2012].

Guy Louchard et al: "Average Profile of Generalized Digital Search Trees and the Generalized Lempel-Ziv Algorithm" , Jan. 1, 1996, XP55026426, Retrieved from the Internet: URL:http://docs.lib.purdue.edu/cgi/viewcontent.cgi?article=2260&context=cstech [retrieved on May 8, 2012] p. 2-p. 4.

Vijay Chandrasekhar et al: "Comparison of local feature descriptors for mobile visual search", 2010 17th IEEE International Conference on Image Processing : (ICIP 2010) ; Hong Kong, Sep. 26, 2010, IEEE, Piscataway, NJ, USA, Sep. 26, 2010, pp. 3885-3888, XP031811617, ISBN: 978-1-4244-7992-4.

Mikolajczyk, K et al., "Improving Descriptors for Fast Tree Matching by Optimal Linear Projection", IEEE 11th International Conference on Digital Object Identifier 10.1109/ICCV,2007.4408871, Computer Vision, 2007. ICCV 2007, 8 pages.

International Search Report and Written Opinion—PCT/US2012/041324—ISA/EPO—Sep. 4, 2012.

Er M. C., "Lexicographic Listing and Ranking of t-ary Trees", Computer Journal, Dec. 1, 1987, pp. 569-572, vol. 30, No. 6, Oxford University Press, XP000743650, ISSN: 0010-4620, DOI: 10. 1093/COMJNL/30.3.282.

Bouteldja N., et al., "HiPeR: Hierarchical progressive exact retrieval in multi dimensional spaces," Proceedings of the 2008 IEEE 24th International Conference on Data Engineering Workshop, Apr. 7-12, 2008, pp. 320-329.

Bouteldja N., et al., "The many Facets of progressive retrieval for CBIR," Advances in multimedia Information processing—PCM 2008, Lecture Notes in Computer Sciences 5353, Dec. 9, 2008, pp. 611-624.

Chandrasekhar V., et al., "Compressed Histogram of Gradients: A Low-Bitrate Descriptor," Int J Comput Vis, vol. 96 (3), 2011, pp. 384-399, XP035008617, DOI 10.1007/s11263-011-0453-z.

Chandrasekhar V., et al., "Low latency image retrieval with progressive transmission of ChoG descriptors," Proceedings of the 2010 ACM Multimedia Workshop on Mobile Cloud Media Computing, Oct. 29, 2010, pp. 41-46.

Iwamoto K., et al., "NEC's Response to the CfP for Compact Descriptor for Visual Search," MPEG Input Document M22717, 98th MPEG Meeting, Geneva, CH, Nov. 2011, 10 Pages.

Li Z., et al., "CDVS CD 6: Incremental query processing with a holistic feature feedbacks," Document M27108, MPEG Meeting Shanghai CN, Oct. 2012, 5 Pages.

Reznik Y.A., et al., "On MPEG work towards a standard for visual search," proceedings of SPIE, Aug. 2011, pp. 813516-1 to 813516-7, vol. 8135.

Tzou K.H., "Progressive image transmission: A review and comparison of techniques," Optical Engineering, Jul. 1987, pp. 581-589, vol. 26 (7).

Xia J., et al., "Geometric context-preserving progressive transmission in mobile visual search," Proceedings of the 20th ACM International Conference on Multimedia, Nara, Japan, Oct. 29-Nov. 2, 2012, pp. 953-956.

Andersson, S., "Improved behaviour of tries by adaptive branching," Information Processing Letters, vol. 46, No. 6, pp. 295-300, Jul. 1993.

Bay H et al., "SURF: Speeded Up Robust Features, Computer Vision and Image Understanding", vol. 110, No. 3, pp. 346-359, 2008.

Chandrasekhar et al., "CHoG: Compressed Histogram of Gradients, A Low Bit-Rate Feature Descriptor," found at www.stanford.edu/-bgirod/pdfs/Chandrasekhar_CVPR2009.pdf, on Jan. 19, 2011, 8 pp.

Chandrasekhar et al., "Quantization Schemes for Low Bitrate Compressed Histogram of Gradients Descriptors," found at http://research.nokia.com/files/public/chandrasekhar_quantization_cvpr10_icmw.pdf.on Jan. 10, 2011, 8 PP.

Chandrasekhar et al., "Survey of SIFT Compression Schemes," found at http://www.stanford.edu/-mamakar/pub_files/VijayICPR-WMMP2010.pdf, on Jan. 20, 2011, 8 pp.

Coffman E. G et al., "File Structures Using Hashing Functions", Communications of the ACM, vol. 13, No. 7, pp. 427-436, 1970.

Cover T. et al., "Data-Processing Inequality" Chapter 2.8 of Elements of Information Theory, p. 34, 1991.

D G Lowe,"Distinctive image features from scale-invariant key points," International Journal of computer vision, vol. 60, pp. 91-110, 2004.

David M. Chen et al., "Tree Histogram Coding for Mobile Image Matching" Data Compression Conference, 2009. DCC '09, IEEE, Piscataway, NJ, USA, Mar. 16, 2009, pp. 143-152, XP031461096.

Drmota M et al., "Tunstall Code, Khodak Variations, and Random Walks", IEEE Trans. Inform. Theory, vol. 56, No. 6, pp. 2928-2937, Jun. 2010.

Flajolet P et al., "Digital Search Trees Revisited", Siam J. Computing, vol. 15, pp. 748-767, 1986.

Fukunaga, "Introduction to Statistical Pattern Recognition Second Edition," Academica Press, Prof., Inc., San Diego, CA, 1990.

Gagie T, "Compressing Probability Distributions", Information Processing Letters, vol. 97, No. 4, pp. 133-137, 2006.

Girod B. et al., "Mobile Visual Search", Proceedings of Special Issue: Mobile Media Search, IEEE Signal Processing Magazine, 2011.

H. Bay, T. Tuytelaars, and L.Van Gool. 'Surf Speeded-up robust features, in 9th European Conference on Computer vision, pp. 405-417, 2006.

J. Ziv and A. Lempel, "Compression of Individual Sequences via Variable-rate Coding", IEEE Transactions on Information Theory, vol. IT-24, No. 5, pp. 530-536, Sep. 1978.

(56) References Cited

OTHER PUBLICATIONS

J.S. Beis and D.G. Lowe. Shape indexing using approximate nearest-neighbour search in high-dimensional spaces. In cvpr, p. 1000. Published by the IEEE Computer Society, 1997.

Katajainen J et al., "Tree Compression and Optimization With Applications", International Journal of Foundations of Computer Science, vol. 1, No. 4, 1990, pp. 425-447.

Khodak G. L, "Redundancy Estimates for Word-Based Encoding of Messages Produced by Bernoulli Sources", Probl. Inform. Trans., 8, (2) (1972) 21-32 (in Russian).

Kirschenhofer P et al., "Some Further Results on Digital Search Trees", Lecture Notes in Computer Science, vol. 229, pp. 177-185, Springer-Verlag, New York, 1986.

Knuth, D. E., "The Art of Computer Programming. Sorting and Searching," vol. 3, Addison-Wesley, Reading, MA, 1973.

Krichevsky, "Universal Data Compression and Retrieval." (Kluwer, Norwell, MA, 1993).

Krystian Mikolajczyk and Cordelia Schmid. "A Performance Evaluation of Local Descriptors," IEEE Transactions on Pattern Analysis and Machine Intelligence, vol. 27, No. 10, Oct. 2005, pp. 1615-1630.

Lewis D et al., "Naive (Bayes) at Forty: The Independence Assumption in Information Retrieval", Proc. 10th European Conference on Machine Learning (ECML-98), 1998, pp. 4-15.

Louchard G et al, "On the Average Redundancy Rate of the Lempel-Ziv Code", IEEE Trans. Information Theory, vol. 43, No. 1, pp. 2-8, Jan. 1997.

Makinen E, "A Survey of Binary Tree Codings", The Computer Journal, vol. 34, No. 5, 1991, pp. 438-443.

Nister et al., "Scalable Recognition with a Vocabulary Tree," 2006 IEEE Computer Society Conference on Computer Vision and Pattern Recognition, 8 pp.

Raphael, et al., "A Hands-On Tour : Google Goggles Visual Search," Google Goggles Visual Search, Dec. 7, 2009, http://www.pcworld.com/printable/article/id,183933/printable.html, 4 pp.

Reznik et al., "Fast Quantization and Matching of Histogram-Based Image Features," found at http://www.reznik.org/ papers/SPIE10_chog_quantization_matching.pdf, on Sep. 3, 2010, 14 pp.

Reznik, "Quantization of Discrete Probability Distributions," WITMSE 2010, Aug. 16-18, 2010, Tampere, Finland, 6 PP.

Reznik Y. A., et al., "On the Average Redundancy Rate of the Lempel-Ziv Code with the K-Error Protocol", Information Sciences, vol. 135, pp. 57-70, 2001.

Reznik Y. A., "Some Results on Tries with Adaptive Branching", Theoretical Computer Science, vol. 289, No. 2, pp. 1009-1026, 2002.

Shi, et al., "Normalized Cuts and Image Segmentation," IEEE Transactions on Pattern Analysis and Machine Intelligence, vol. 22, No. 8, pp. 888-905, Aug. 2000.

Szpankowski W, "A Characterization of Digital Search Trees From the Successful Search Viewpoint", Theoretical Computer Science, vol. 85, pp. 117-134, 1991.

Takacs G, et al., "Outdoors augmented reality on mobile phone using loxel-based visual feature organization", Proceedings of the 2008 ACM International Conference on Multimedia With Co-Located Symposium & Workshops, Vancouver, BC, Canada, Oct. 27, 2008, pp. 427-434, XP007915264, DOI: 10.1145/1460096.1460165 ISBN: 978-1-60558-312-9, In particular, Sections 1, 2, 3 and 5.

Tsai, et al., "Fast Geometric Re-Ranking for Image-Based Retrieval," 17th IEEE International Conference on Image Processing, Hong Kong, pp. 1029-1032, Sep. 26-29, 2010.

Tunstall B. P., "Synthesis of Noiseless Compression Codes", Ph.D. dissertation, Georgia Inst. Tech., Atlanta, GA, 1967.

U.S. Appl. No. 13/158,013, by Yuriy Reznik, filed Jun. 10, 2011.

U.S. Appl. No. 12/790,265, filed May 28, 2010, entitled "Efficient Coding of Probability Distributions for Image Feature Descriptors," Reznik.

U.S. Appl. No. 12/794,271, filed Jun. 4, 2010, entitled "Efficient Incremental Coding of Probability Distributors for Image Feature Descriptors," Reznik.

Vijay Chandrasekhar., et al., "Quantization schemes for low bitrate Compressed Histogram of Gradients descriptors", Computer Vision and Pattern Recognition Workshops (CVPRW), 2010 IEEE Computer Society Conference on, IEEE, Piscataway, NJ, USA, Jun. 13, 2010, pp. 33-40, XP031728429, ISBN: 978-1-4244-7029-7.

Willems F et al, "The Context-Tree Weighting Method: Basic Properties", IEEE Trans. Inform. Theory, vol. 41, No. 3, pp. 653-664, May 1995.

Zaks S, "Lexicographic Generation of Ordered Trees", Theoretical Computer Science, vol. 10, 1980, pp. 63-82.

Zheng et al., "Fast Progressive Image Retrieval Schemes Based on Updating Enhanced Equal-average Equalvariance K-Nearest Neighbour Search in Vector Quantised Feature Database," ICICS 2007, date of current version: Feb. 12, 2008, 5 pp.

\* cited by examiner

US 8,706,711 B2

DESCRIPTOR STORAGE AND SEARCHES OF K-DIMENSIONAL TREES

CROSS REFERENCES

Priority is claimed to U.S. Patent Application No. 61/500,059, entitled "Systems and Methods for Optimizing Descriptor Storage and Searches," filed on Jun. 22, 2011. This application is incorporated in its entirety for all purposes.

BACKGROUND

When performing image-based object recognition, characteristics of the image may be compared with a stored set of characteristics. The storage space necessary for such a stored set of characteristics may be large. Further, searching such a stored set of characteristics may be processor-intensive (which may result in significant power usage) and/or may be time-consuming. As such, reducing the size of the stored set of characteristics and/or decreasing the processing time necessary to conduct a search of the stored set of characteristics may be desired.

SUMMARY

Various arrangements for using a k-dimensional tree for a search are presented. In some examples, a method for using a k-dimensional tree for a search are presented. The method may include storing a plurality of descriptors, wherein each of the plurality of descriptors stored is linked with a first number of stored dimensions. The method may include searching, by a computer system, the k-dimensional tree with a query descriptor to find a matching descriptor from among the plurality of descriptors linked with the first number of stored dimensions. The k-dimensional tree may be built using the plurality of descriptors wherein each of the plurality of descriptors is linked with a second number of dimensions when the k-dimensional tree is built. The second number of dimensions may be a greater number of dimensions than the first number of stored dimensions.

Embodiments of such a method may include one or more of the following: The method may include building the k-dimensional tree using the plurality of descriptors, wherein each of the plurality of descriptors is linked with the second number of dimensions when the k-dimensional tree is built. Each dimension stored as part of the first number of stored dimensions may match a dimension of the second number of dimensions used to build the k-dimensional tree. Each dimensions stored as part of the first number of stored dimensions may be compressed using a PCA sub-space projection. The method may include determining the query descriptor based on a query image. The method may include identifying one or more images that at least approximately match the query image based at least in part on the search using the k-dimensional tree. The plurality of descriptors may be at least partially based on image data. The method may include storing a second plurality of descriptors, wherein each of the second plurality of descriptors stored is linked with the first number of stored dimensions. The method may include, following searching the k-dimensional tree, searching a second k-dimensional tree using the query descriptor to find the matching descriptor from among the second plurality of descriptors linked with the first number of stored dimensions. The second k-dimensional tree may be built using the second plurality of descriptors where each of the second plurality of descriptors is linked with the second number of dimensions when the second k-dimensional tree is built. Searching the second k-dimensional tree may be performed because the matching descriptor was not located when searching the k-dimensional tree.

In some examples, a computer-readable medium is presented. The computer-readable medium may comprise instructions configured to cause a computer to store a plurality of descriptors. Each of the plurality of descriptors stored may be linked with a first number of stored dimensions. The computer-readable medium may comprise instructions configured to cause the computer to search a k-dimensional tree with a query descriptor to find a matching descriptor from among the plurality of descriptors linked with the first number of stored dimensions. The k-dimensional tree may be built using the plurality of descriptors wherein each of the plurality of descriptors is linked with a second number of dimensions when the k-dimensional tree is built. The second number of dimensions may be a greater number of dimensions than the first number of stored dimensions.

Embodiments of such a computer readable medium may include one or more of the following: The instructions may be further configured to cause the computer to build the k-dimensional tree using the plurality of descriptors, wherein each of the plurality of descriptors is linked with the second number of dimensions when the k-dimensional tree is built. Each dimension stored as part of the first number of stored dimensions may match a dimension of the second number of dimensions used to build the k-dimensional tree. The instructions may be further configured to cause the computer to determine the query descriptor based on a query image. The instructions may be further configured to cause the computer to identify one or more images that at least approximately match the query image based at least in part on searching the k-dimensional tree. The plurality of descriptors may be at least partially based on image data. The instructions may be further configured to cause the computer to store a second plurality of descriptors, wherein each of the second plurality of descriptors stored is linked with the first number of stored dimensions. The instructions may be further configured to cause the computer to, following searching the k-dimensional tree, search a second k-dimensional tree using the query descriptor to find the matching descriptor from among the second plurality of descriptors linked with the first number of stored dimensions. The second k-dimensional tree may be built using the second plurality of descriptors wherein each of the second plurality of descriptors is linked with the second number of dimensions when the second k-dimensional tree is built. Searching the second k-dimensional tree may be performed because the matching descriptor was not located when searching the k-dimensional tree.

In some examples, a system for using a k-dimensional tree for a search is presented. The system may include a processor. The system may also include a first memory communicatively coupled with and readable by the processor having stored therein a series of processor-readable instructions. When executed by the processor, the processor-readable instructions cause the processor to cause a plurality of descriptors to be stored. Each of the plurality of descriptors stored may be linked with a first number of stored dimensions. The processor-readable instructions cause the processor to search the k-dimensional tree with a query descriptor to find a matching descriptor from among the plurality of descriptors linked with the first number of stored dimensions. The k-dimensional tree may be built using the plurality of descriptors wherein each of the plurality of descriptors is linked with a second number of dimensions when the k-dimensional tree is built. The second number of dimensions may be a greater number of dimensions than the first number of stored dimensions.

Embodiments of such a system may include one or more of the following: The series of processor-readable instructions may be further configured to cause the processor to build the k-dimensional tree using the plurality of descriptors, wherein each of the plurality of descriptors is linked with the second number of dimensions when the k-dimensional tree is built. Each dimension stored as part of the first number of stored dimensions may match a dimension of the second number of dimensions used to build the k-dimensional tree. The series of processor-readable instructions may be further configured to cause the processor to determine the query descriptor based on a query image. The processor and memory may be part of a computer server system. The processor and memory may be part of a mobile device. The system may include an interface to receive the plurality of descriptors. The system may have an interface configured to receive an indication to perform an image search, the indication may comprise the query descriptor and/or an image captured by a mobile device. The series of processor-readable instructions may be further configured to cause the processor to identify an image that at least approximately matches the query image based at least in part on searching the k-dimensional tree. The series of processor-readable instructions may be further configured to cause the processor to store a second plurality of descriptors, wherein each of the second plurality of descriptors stored is linked with the first number of stored dimensions. The plurality of descriptors may be at least partially based on image data. The series of processor-readable instructions may be further configured to cause the processor to, following searching the k-dimensional tree, search a second k-dimensional tree using the query descriptor to find the matching descriptor from among the second plurality of descriptors linked with the first number of stored dimensions. The second k-dimensional tree may be built using the second plurality of descriptors wherein each of the second plurality of descriptors is linked with the second number of dimensions when the second k-dimensional tree is built. Searching the second k-dimensional tree may be performed because the matching descriptor was not located when searching the k-dimensional tree.

In some examples, an apparatus for using a k-dimensional tree for a search is presented. The apparatus may include means for storing a plurality of descriptors. Each of the plurality of descriptors stored may be linked with a first number of stored dimensions. The apparatus may include means for searching the k-dimensional tree with a query descriptor to find a matching descriptor from among the plurality of descriptors linked with the first number of stored dimensions. The k-dimensional tree may be built using the plurality of descriptors wherein each of the plurality of descriptors is linked with a second number of dimensions when the k-dimensional tree is built. The second number of dimensions may be a greater number of dimensions than the first number of stored dimensions.

Embodiments of such an apparatus may include one or more of following: The apparatus may include means for building the k-dimensional tree using the plurality of descriptors, wherein each of the plurality of descriptors is linked with the second number of dimensions when the k-dimensional tree is built. Each dimension stored as part of the first number of stored dimensions may match a dimension of the second number of dimensions used to build the k-dimensional tree. The apparatus may include means for determining the query descriptor based on a query image. The apparatus may include means for identifying one or more images that at least approximately match the query image based at least in part on searching the k-dimensional tree. The plurality of descriptors may be at least partially based on image data. The apparatus may include means for storing a second plurality of descriptors, wherein each of the second plurality of descriptors stored is linked with the first number of stored dimensions. The apparatus may include means for searching a second k-dimensional tree using the query descriptor to find the matching descriptor from among the second plurality of descriptors linked with the first number of stored dimensions. The second k-dimensional tree may be built using the second plurality of descriptors where each of the second plurality of descriptors is linked with the second number of dimensions when the second k-dimensional tree is built. The second search using the second k-dimensional tree may be performed because a matching descriptor was not located when searching the k-dimensional tree.

In some examples, a system for using a k-dimensional tree for a search is presented. The system may include a mobile device that comprises an image capture device. The mobile device may be configured to capture a query image. The mobile device may be configured to create a query descriptor using the query image. The mobile device may be configured to transmit the query descriptor to a computer system. The system may include the computer system, which may comprise a computer-readable medium comprising instructions configured to cause a computer to receive the query descriptor from the mobile device. The computer-readable medium comprising instructions configured to cause the computer to cause a plurality of descriptors to be stored. Each of the plurality of descriptors stored may be linked with a first number of stored dimensions. The computer-readable medium comprising instructions configured to cause the computer to search the k-dimensional tree with the query descriptor to find a matching descriptor from among the plurality of descriptors linked with the first number of stored dimensions. The k-dimensional tree may be built using the plurality of descriptors wherein each of the plurality of descriptors is linked with a second number of dimensions when the k-dimensional tree is built. The second number of dimensions may be a greater number of dimensions than the first number of stored dimensions.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
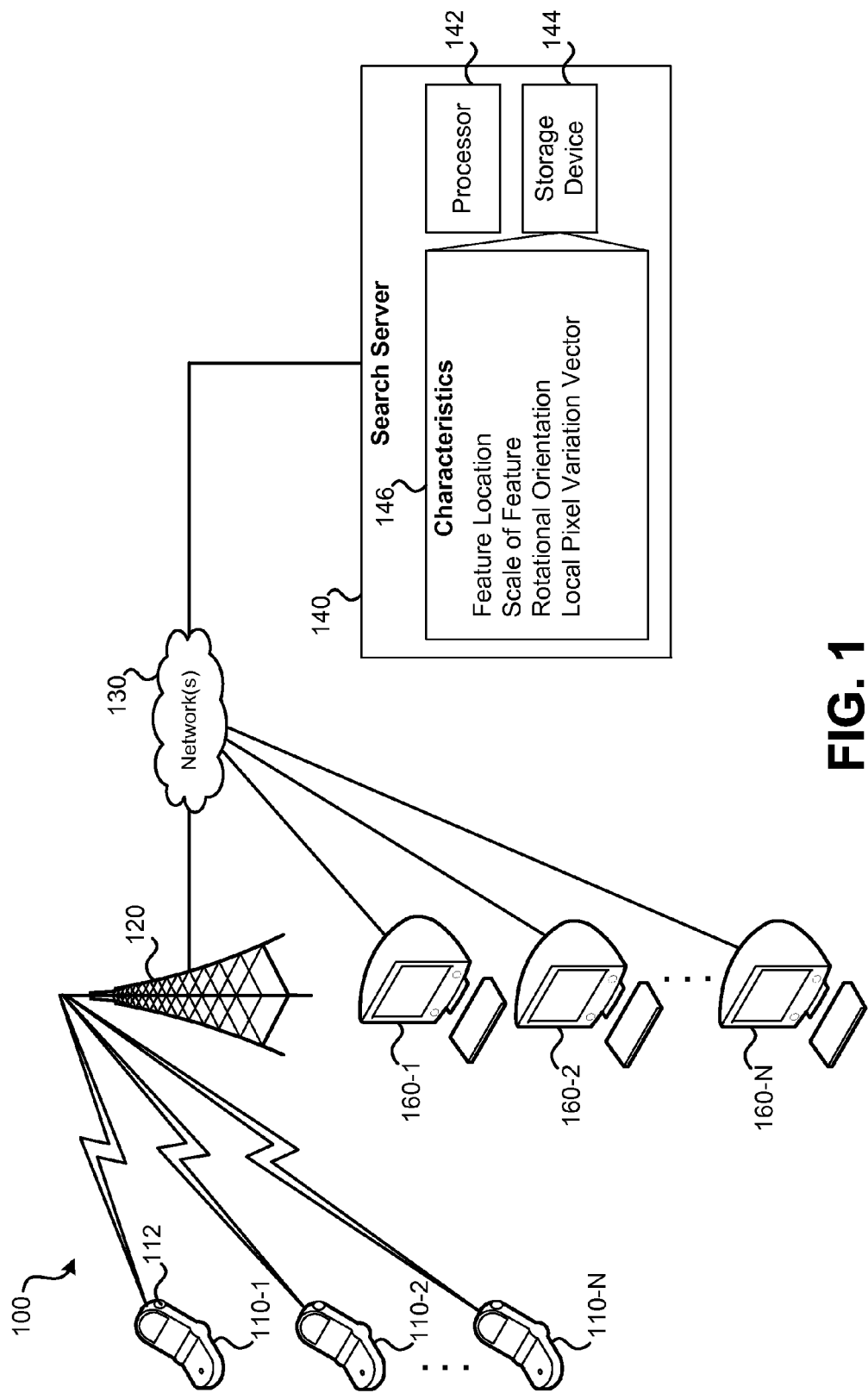
FIG. 1 illustrates an embodiment of a system configured to perform image-based object recognition.

To identify an entity (e.g., an object, a symbol, a pattern), an image of the entity may be captured. Characteristics of the captured image may then be compared to a stored set of characteristics (which may be at least partially based on image data from a training set of images) to determine whether characteristics of the captured image correspond to characteristics present in the stored set of characteristics. If a match (within a certain amount of tolerance) is identified, this may indicate that the matching stored characteristics are associated with a similar entity as the entity present in the captured image. As an example, consider an image captured of the Mona Lisa. This captured image may be processed to identify various characteristics of the captured image. These characteristics may then be used to search a stored set of characteristics, which may be stored either locally to the device that captured the image or remotely. If a match is found, the matching characteristics from the stored set of characteristics may correspond to a similar image (e.g., another image of the Mona Lisa).

In order to increase the likelihood of identifying a match to characteristics of a captured image, a large number of characteristics may be needed to be stored in the stored set of characteristics. The greater the number of characteristics present in the stored set of characteristics, the greater the amount of storage space the stored set of characteristics can be expected to require on a storage device, such as computer-readable memory (e.g., RAM) or a hard drive. As an example, the stored set of characteristics may include characteristics from thousands or possibly millions of training images. Additionally, when characteristics of a captured image are to be used for a search within the stored set of characteristics, due to the possibly large number of characteristics present in the stored set of characteristics, a search may be time-consuming and/or processor-intensive. The use of a compressed k-dimensional tree (also referred to as a compressed k-d tree), as discussed below, to organize at least some of the stored set of characteristics may permit the search to be less processor-intensive and/or require less storage space than some alternatives.

Generally, a compressed k-d tree is a k-d tree that is structured using a greater number of dimensions than the number of dimensions that are stored for each node of the k-d tree. For example, if each node of a set of nodes has 100 dimensions, these 100 dimensions may be used to create the structure of a compressed k-d tree. When the nodes are stored, only some of the 100 dimensions used to structure the compressed k-d tree may be retained. For example, only 50 of the 100 dimensions for each node of the compressed k-d tree may be stored; the remaining dimensions may be discarded or stored elsewhere. While the described embodiments involving compressed k-d trees are directed to matching descriptors based on a captured image to stored descriptors of other images, it should be understood that the use of compressed k-d trees may have other applications besides locating a matching image.

FIG. 1 illustrates an embodiment of a system 100 configured for performing image-based object recognition. Embodiments of system 100 may include some or all of the following components: mobile devices 110, computer systems 160, wireless network 120, network 130, and search server 140. A mobile device, such as mobile device 110-1, may communicate with search server 140 via wireless network 120 and network 130. Mobile device 110 may represent a cellular phone or some other mobile computerized device, such as a tablet computer, laptop, handheld gaming device, digital camera, etc. Mobile device 110 may include image capture device 112. Image capture device 112 may be a still camera and/or a video camera. Image capture device 112 may permit mobile device 110 to capture (digital) images of the mobile device's surrounding physical environment.

Wireless network 120 may represent a cellular service provider's wireless network. The wireless network 120 may use network 130 to communicate with search server 140. Network 130 may include one or more private networks, such as a corporate intranet, and/or one or more public networks, such as the Internet. System 100 illustrates three mobile devices (110-1, 110-2, and 110-N) as being in communication with wireless network 120. It should be understood that fewer or greater numbers of mobile devices may be present in other embodiments of system 100.

Search server 140 may be in communication with computer systems 160 via network 130. Images may be captured directed by computer systems 160, such as via a webcam, or may be loaded onto computer systems 160, such as from digital cameras. System 100 illustrates three computer systems (160-1, 160-2, and 160-N) as being in communication with wireless network 120. It should be understood that fewer or greater numbers of mobile devices may be present in other embodiments of system 100.

Search server 140 may include processor 142 and storage device 144. Search server 140 may include other components not illustrated. Storage device 144 may store a database, or some other type of storage arrangement, containing the set of characteristics used to identify entities present in an image captured by image capture device 112 of mobile device 110-1, images captured by other image capture devices, and/or images received by computer systems 160. Search server 140 may include an interface to receive characteristics for storage and/or an interface to receive an indication to perform a search. Such an indication may include an image or characteristics to be used for the search.

Storage device 144 may store a database of a large number of characteristics 146. Characteristics 146 may contain feature descriptors (also referred to as "descriptors") and other information (such as: two dimensional (x, y) feature location, scale at which the feature is detected, and the rotational orientation of the feature as given by that of the strongest image gradient in the feature neighborhood) derived from training images used to identify objects present in images captured by the computerized device. While multiple types of characteristics may be used to identify entities that match in images, this document focuses on identifying matching descriptors. A large number of descriptors (e.g., thousands of descriptors, millions of descriptors) may be stored as part of the set of characteristics 146. These descriptors may be derived from training images. As an example, if each descriptor contains 128 dimensions and each dimension is one byte in size, then each descriptor results in 128 bytes of data. If millions of descriptors are present, the amount of storage space required may be at least in the hundreds of megabytes.

In some embodiments, rather than the set of characteristics 146 being stored by search server 140, characteristics 146 may be stored locally by mobile devices 110 and/or computer systems 160. As such, rather than communicating with search server 140 to conduct a search and identify matching characteristics, the search can be conducted locally by the mobile devices 110 and/or computer systems 160. In such embodiments, mobile device 110 and/or computer system 160 may include an interface configured to receive characteristics for storage and/or an interface to receive an indication to perform a search. Such an indication may include an image or characteristics to be used for the search. Further, some hybrid arrangement may be used: a search may be conducted locally by mobile devices 110 and/or computer systems 160; if a sufficient match is not located, search server 140 may be used.

Due to the potentially high number of descriptors stored in the database on storage device 144 (or locally by mobile devices 110 and/or computer systems 160), an efficient way of searching these descriptors may be useful. A k-dimensional tree is a data structure that may be used for organizing a set of points in multiple dimensions. The number of dimensions may be variable (e.g., k dimensions are present). For example, a k-d tree could have 10, 20, 100, or 200 dimensions. K-d trees allow nearest neighbor searches to be performed. In a nearest neighbor search, the closest node of the k-d tree to an input point, referred to herein as a query descriptor, is identified by calculating the $L^2$ (Euclidean) distance between the input point and nodes of the k-d tree. Calculation of the $L^2$ distance may be performed regardless of the number of dimensions present in the input point and nodes of the k-d tree. For example, the $L^2$ distance can be calculated if three dimensions or 128 dimensions are present.

In some embodiments, a compressed k-dimensional k-d tree (for short, also referred to as a compressed k-d tree) can be generated and used to locate matches (within some amount of tolerance) between stored descriptors and a query descriptor. To be clear, throughout this document, identifying a "match" refers to identifying a descriptor that matches the query descriptor within an amount of tolerance and does not refer to only an exact match. A stored descriptor of a compressed k-d tree may require less storage space and allow for faster searches than stored descriptors of a conventional k-d tree. Referring to the example of image-based object recognition, a query descriptor may be derived from an image captured by a camera of a mobile device. The query descriptor may be created from a captured image (also referred to as a query image when used to create a query descriptor) by the device that captured the image, a search server, or an intermediary device. Referring to system 100, for example, the query descriptor may be created by mobile device 110-1 based on an image captured by image capture device 112, by computer system 160-1 based on an image captured by a webcam of computer system 160-1, or a device that is in communication with computer system 160-1, such as a digital camera. In system 100, devices such as mobile devices 110 and computer systems 160 may transmit images to search server 140 which may use the received image to create a query descriptor. In some embodiments, a server separate from search server 140 may be used to create query descriptors. A compressed k-d tree may contain descriptors derived from a set of training images. As such, searching the compressed k-d tree based on the query descriptor may allow for an entity in the image to be identified by comparing one or more query descriptors based on the captured image with stored descriptors that are based on training images stored as part of a compressed k-d tree.

A k-d tree contains nodes, which may be descriptors. Each of these nodes may have the same number of dimensions. As an example, a k-dimensional tree that has 128 dimension descriptors as nodes can be generated. In a compressed k-d tree, rather than storing every dimension of the nodes, only some of the dimensions may be stored. Decreasing the number of dimensions stored may require less storage space on a storage device, such as storage device 144 of system 100. Decreasing the number of dimensions may also speed searching of the compressed k-d tree and, therefore, may require less processing resources and possibly decrease power consumption. In some embodiments, the dimensions that are selected for storage are those with the largest variances identified across all the stored descriptors. Storing only the dimensions that offer greater amounts of variance allows the dimensions that contribute the most significant values when calculating the $L^2$ distance between two descriptors to be retained, while ignoring dimensions that contribute less to the $L^2$ distance. In some embodiments, 48 dimensions offering higher levels (e.g., the maximum levels) of variance are chosen and stored; the remaining dimensions may not be stored (e.g., deleted). In doing so, a compact representation of the descriptor database may be achieved. In some embodiments, a compressed version of the descriptors are stored. The compression may be done by various techniques, such as PCA (principal component analysis) sub-space projection. In doing so, a compact representation of the descriptor database may be achieved. In some embodiments, the optimal dimensions offering higher levels (e.g., the maximum levels) of variance for each descriptor can be stored instead of an optimal dimension set for the entire database. As such, different stored descriptors may have different dimensions stored. In doing so, a more compact representation of the descriptor database may be achieved.

Figure 2:
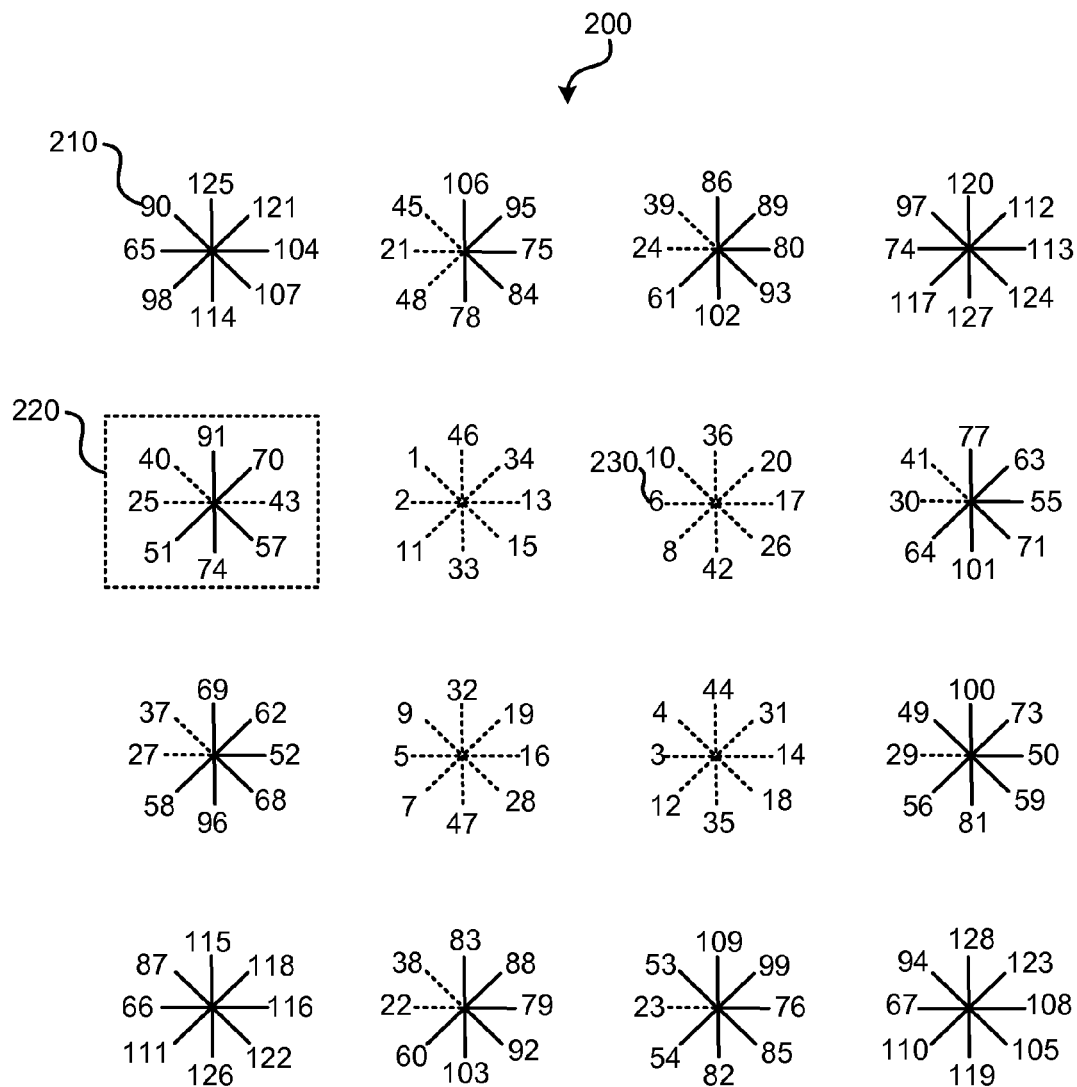
FIG. 2 illustrates an embodiment of a descriptor having 128 dimensions.

FIG. 2 illustrates an embodiment of a descriptor 200 having 128 dimensions. Descriptor 200 may be derived from a feature of a training image. In the illustrated embodiment of descriptor 200, 16 spatial pooling regions, also referred to as grid points, are present. In the illustrated embodiment, each of these grid points, for example grid point 220, has 8 dimensions, such as dimension 210. Each dimension may be represented by a numerical value that identifies a gradient of variability in a direction from the grid point. The numerical value may be relative to other values of dimensions of the same descriptor. As such, the 128 dimensions of descriptor 200 are ranked from 1 to 128 (e.g., from most variable to least variable). For example, since 128 dimensions are present in the descriptor, the value 90 of dimension 210 may mean that out of the 128 dimensions of descriptor 200, dimension 210 had the 90th most variability.

Rather than storing all 128 dimensions of descriptor 200 as part of a k-d tree, only a subset of the dimensions may be stored. The stored dimensions may be dimensions that show the greatest amount of variability across the set of stored dimensions. For example, referring to descriptor 200, dimensions linked with dotted lines may represent dimensions that have a higher level of variability and are to be stored for use in a compressed k-d tree (an example of such a dimension to be stored is dimension 230). Solid lines represent dimensions that are to be discarded (e.g., deleted) and not stored as part of the compressed k-d tree (an example of such a dimension is dimension 210). The dimensions that are selected to be retained for the compressed k-d tree may be the dimensions across some or all of the stored descriptors that show the greatest amount of variability. Preference may be given to dimensions closer to the center of the feature. For example, if 48 dimensions are to be retained as part of the compressed k-d tree, the center 36 dimensions (that may correspond to the middle of a feature) may be retained for each descriptor. The remaining 12 dimensions may be other dimensions present in the descriptor that show the highest level of variability across the stored dimensions (or, in some embodiments, the highest level of variability for that particular descriptor). When descriptor 200 is stored as part of the compressed k-d tree having 48 dimensions, only dimensions associated with dotted lines (e.g., the dimensions having the greatest variability across the set of descriptors) may be retained. The remaining dimensions may be discarded, such that 80 dimensions of descriptor 200 are discarded. The same 80 dimensions may be discarded for other stored descriptors such that each stored descriptor has 48 dimensions, rather than 128 dimensions. Each descriptor may have the same 48 dimensions. In some embodiments, the dimensions retained as part of the 48 dimensions may vary from descriptor to descriptor. While only 48 dimensions may be stored for each descriptor, the structure of the compressed k-d tree may be based on the entire 128 dimensions. As such, the structure of the compressed k-d tree determined using the 128 dimensions may vary from the structure of a compressed k-d tree that would be created if only the 48 dimensions were used to determine the structure.

Figure 3:
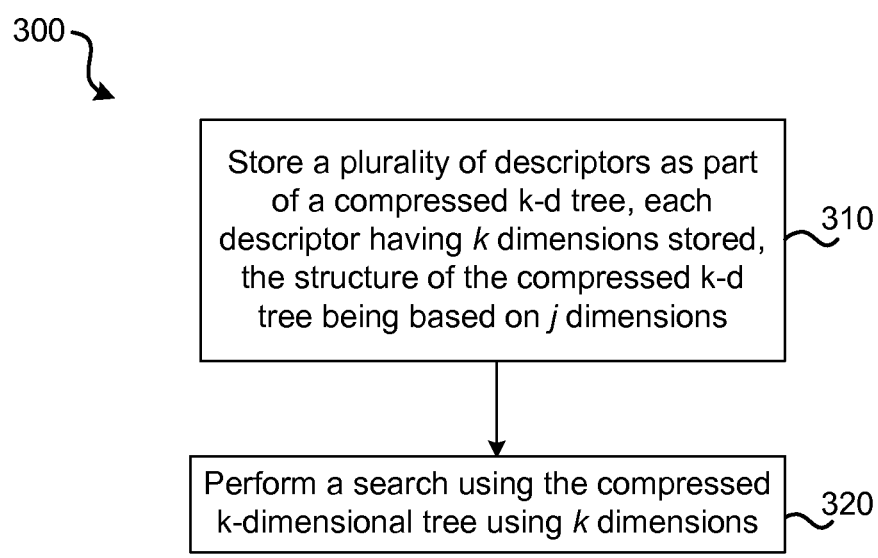
FIG. 3 illustrates an embodiment of a method for searching a compressed k-dimensional tree.

To create and/or search compressed k-d trees, various methods may be used. Methods to create and search compressed k-d trees may utilize embodiments of system 100 of FIG. 1. Such methods may also utilize other systems that are configured to create and/or search compressed k-dimensional trees. FIG. 3 illustrates an embodiment of a method 300 for searching a compressed k-dimensional tree. Method 300 may be performed by various embodiments of system 100 or by some other system configured to search compressed k-d trees. Each step of method 300 may be performed by search server 140, a mobile device such as mobile device 110-1, or a computer system such as computer system 160-1.

At step 310, a plurality of descriptors are stored, each descriptor having k number of dimensions. While k number of dimensions may be stored for each descriptor, the structure of the compressed k-d tree may be based on a different number of dimensions for each descriptor. The structure of the compressed k-d tree may be based on j dimensions. The number of j dimensions is greater than k dimensions. As such, a greater number of dimensions is used to create the structure of the compressed k-d tree than the number of dimensions that is stored for each descriptor. Each of k dimensions may be one of j dimensions. As such, k dimensions are dimensions from j that were selected to be retained. The k dimensions may have been selected to be retained because these dimensions showed the greatest amount of variability across the dimensions of the plurality of descriptors that are stored. As an example, 128 dimensions may be used to create the structure of a compressed k-d tree, but only 48 of these 128 dimensions may be retained and stored for each descriptor of the k-d tree.

At step 320, a search may be performed using the compressed k-d tree that was structured using j dimensions, but has descriptors stored with only k dimensions selected from j dimensions. Because only k dimensions are stored, the descriptors may occupy less storage space. Further, because only k dimensions are stored, the search, which may be a nearest neighbor search, may require fewer calculations (such as to compute the $L^2$ distance between the query descriptor and the stored descriptors), therefore requiring less processing, which may decrease the amount of time to conduct the search and/or decrease the amount of power necessary to conduct the search. Because the k dimensions that were stored were the dimensions of j that had more variability than the other dimensions of j, the results of the search may be expected to be similar to results as if j dimensions had been stored and used for computing the $L^2$ distance between the query descriptor and the stored descriptors.

Figure 4:
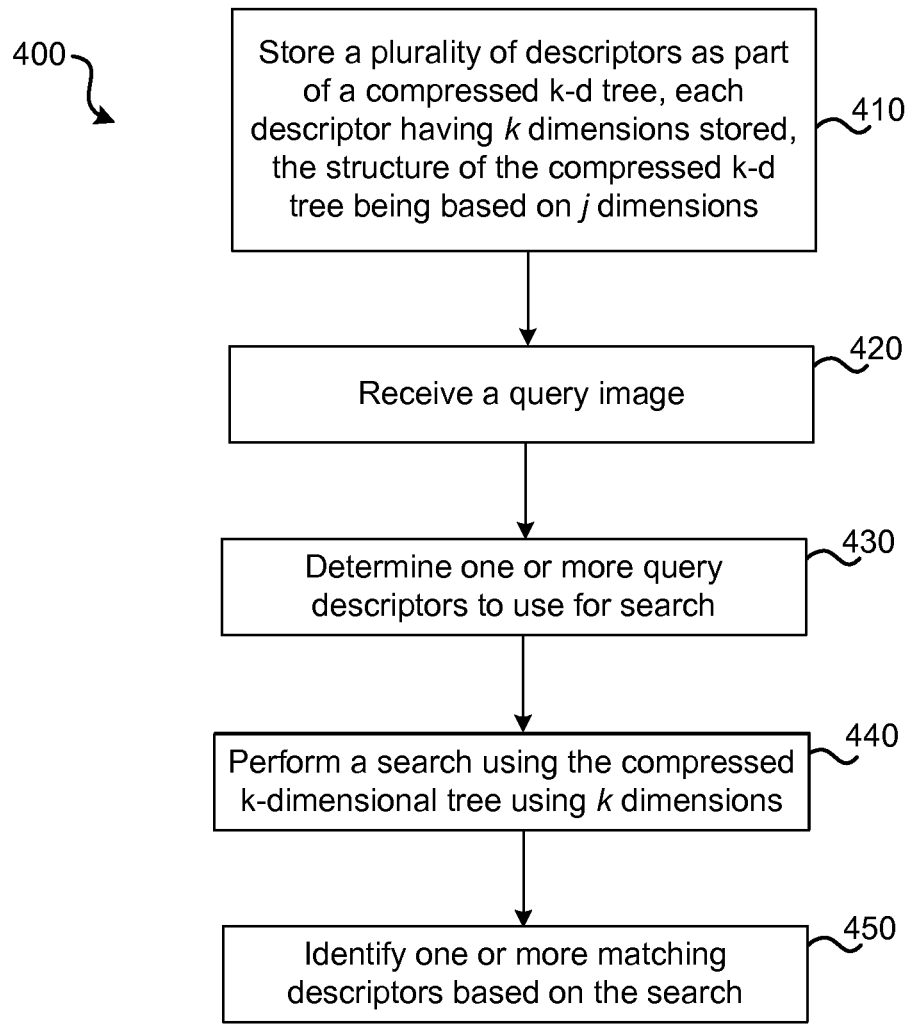
FIG. 4 illustrates another embodiment of a method for searching a compressed k-dimensional tree.

FIG. 4 illustrates an embodiment of a method 400 for searching a compressed k-d tree. Method 400 may be performed by various embodiments of system 100 or by some other system configured to search compressed k-d trees. Each step of method 400 may be performed by search server 140, a mobile device such as mobile device 110-1, or a computer system such as computer system 160-1.

At step 410, a plurality of descriptors may be stored. Each of these descriptors may be linked with k number of dimensions. While k number of dimensions may be stored for each descriptor, the structure of the compressed k-d tree may be based on a different number of dimensions for each descriptor. The structure of the compressed k-d tree may be based on j dimensions. The number of j dimensions may be greater than k dimensions. As such, a greater number of dimensions may be used to create the structure of the compressed k-d tree than the number of dimensions that is stored for each descriptor as part of the compressed k-d tree. As an example, 128 dimensions for each descriptor may be used to create the structure of a compressed k-d tree, but only 48 dimensions may be stored for each descriptor of the compressed k-d tree after the structure has been created. The dimensions that are not stored for the stored descriptors may be stored at some other location to prevent data loss. In some embodiments, the dimensions not stored are deleted and lost. Each of k dimensions is one of j dimensions. As such, the k dimensions are dimensions from among j that were selected to be retained. The k dimensions may have been selected to be retained because these dimensions showed the greatest amount of variability across the dimensions of the plurality of descriptors that are stored.

At step 420, a query image may be received. The query image may be an image captured that is to be matched with a training image. The query image may be captured by an image capture device, such as image capture device 112 of mobile device 110-1 of system 100. If method 400 is being performed by search server 140, the query image may be received from the device that captured the image, such as mobile device 110-1. If each step of method 400 is being performed locally by a device, such as mobile device 110-1, the query image may not need to be received from an external source.

At step 430, a query descriptor (or multiple query descriptors) to use for the search may be determined. The query descriptor may be based on the query image captured at step 420. The query descriptor created based on the query image may contain a number of grid points and a number of dimensions. The number and location of the grid points and/or the number of dimensions may correspond to the grid points and/or number of dimensions (k) of the plurality of stored descriptors. The query descriptor may have k dimensions. These k dimensions may be the same dimensions selected for the database descriptors. In some embodiments, if a compression technique, such as PCA, is used for the database descriptors, the same technique may be used for the query descriptor.

At step 440, a search may be performed using the compressed k-d tree that was structured using j dimensions, but has descriptors stored with only k dimensions that were selected from j dimensions. Because only k dimensions are stored, the descriptors may occupy less storage space. Further, because only k dimensions are stored, the search, which may be a nearest neighbor search, may require fewer calculations (such as to compute the $L^2$ distance between the query descriptor and the stored descriptors), therefore requiring less processing, which may decrease the amount of time to conduct the search and/or decrease the amount of power necessary to conduct the search. Because the k dimensions that were stored were the dimensions of j that had more (e.g., the most) variability than the other dimensions of j, the results of the search may be expected to be similar to results as if j dimensions had been stored and used for computing the $L^2$ distance between the query descriptor and each descriptor of the stored plurality of descriptors.

A best-bin-first k-d tree algorithm may be used to determine the approximate nearest neighbor of a query descriptor. The algorithm may access the leaf location in logarithmic steps using binary decisions. As the leaf cell does not necessarily include the correct nearest neighbor, backtrackings may be performed. This may be done by visiting all (or some subset) of other subtrees in the neighborhood of the leaf node and calculating $L_2$ distances between the query and the descriptors in the neighborhood. The subtrees in the neighborhood, which are to be visited, may be stored in a dynamic priority queue. This priority queue may be built as the tree was initially traversed. The priority queue may list, in order, subtrees which are more likely to contain the true nearest neighbor. This may ensure that a fewer number of backtrackings are sufficient to get an approximate nearest neighbor.

At step 450, one or more matching descriptors that are stored among the plurality of descriptors may be identified based on the search of step 440. Each of these descriptors may be linked with a training image. The identification of a stored descriptor that matches the query descriptor may indicate that one or more entities present in the query image match one or more entities present in the training image used to create the stored descriptor. As such, the entity present in the training image may represent an entity present in the query image.

Figure 5:
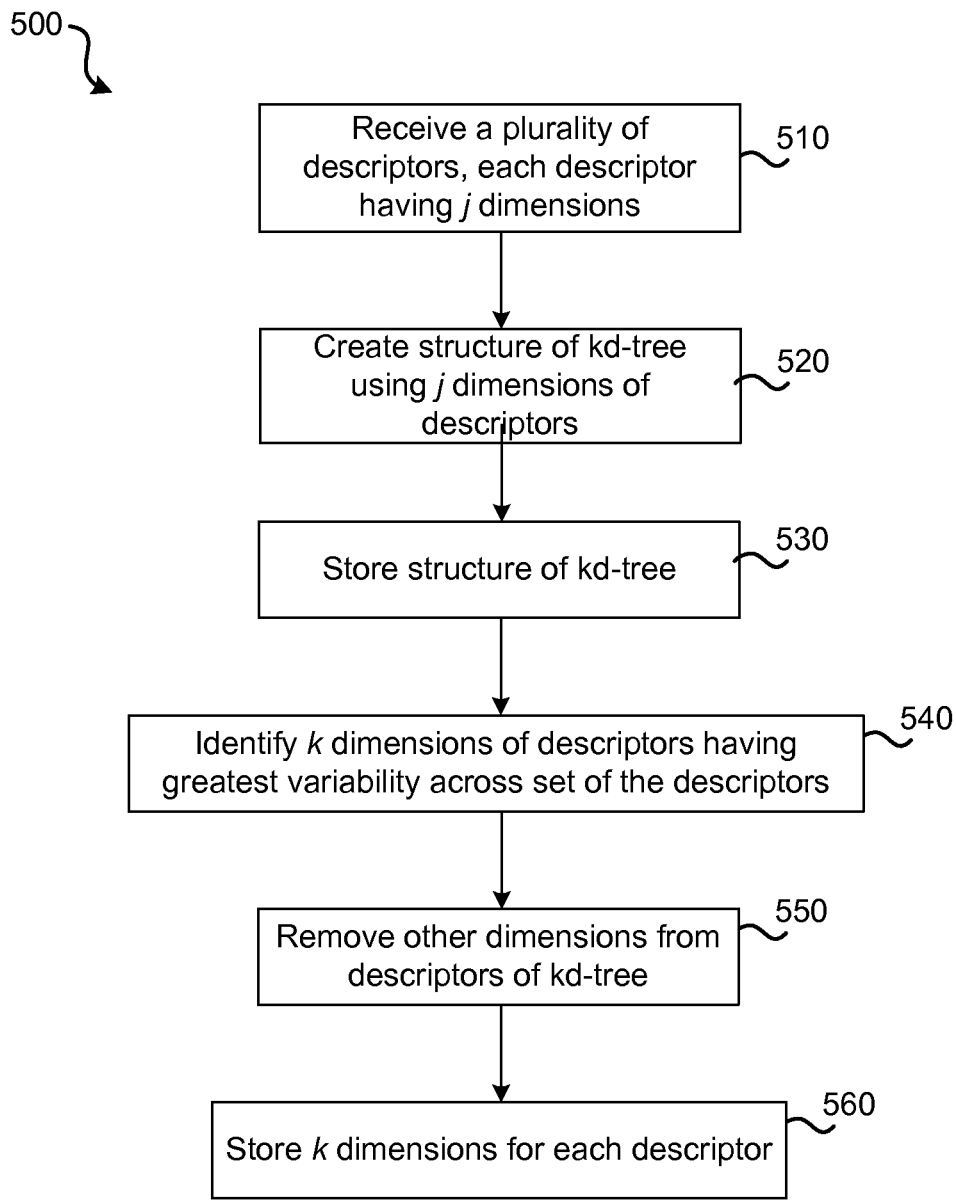
FIG. 5 illustrates an embodiment of a method for creating a compressed k-dimensional tree.

FIG. 5 illustrates an embodiment of a method 500 for creating a compressed k-dimensional tree. Such a method may be performed by a computer system. Referring to FIG. 1, a server, such as search server 140, may perform the steps of method 500. Alternatively, a mobile device, such as mobile device 110-1, or a computer system, such as computer system 160-1, may perform method 500.

At step 510, a plurality of descriptors may be received. Each descriptor of the plurality of descriptors may have j dimensions. Each descriptor of the plurality of descriptors may be derived from a training image. As such, in some embodiments, rather than receiving a set of descriptors having j dimensions, a set of training images may be received. Based on each training image, one or more descriptors may be created, each having j dimensions. As an example, these descriptors may be associated with training images used for image-based object recognition. In some embodiments, the number of j dimensions may be 128. The structure of a k-d tree may be created using the j dimensions of the descriptors at step 520. At step 530, the structure of the k-d tree created using the j dimensions is stored.

At step 540, k number of dimensions are identified as desired to be stored for the descriptors of the compressed k-d tree. The desired value of k may be specified by a user or may be determined by the computer system based on factors such as the amount of storage space available. At step 540, the dimensions across the plurality of descriptors having the greatest amount of variability may be identified. As such, while a dimension in a particular descriptor may have a high amount of variability compared to other dimensions within the same descriptor, corresponding dimensions in other descriptors may not, on average, have a high variability. As such, this dimension may be discarded from all descriptors in the set of descriptors. In some embodiments, besides selecting dimensions with the most variability for inclusion in the compressed k-d tree, preference may be given based on other factors, such as to dimensions near the center of the descriptor. In some embodiments, rather than retaining the dimensions across the plurality of descriptors having the greatest amount of variability, the dimensions that have the greatest amount of variability for an individual descriptor may be retained. As such, in such embodiments, different dimensions may be retained for different descriptors of the plurality of descriptors.

At step 550, j dimensions not among the k dimensions are removed from the k-d tree. The removed dimensions may be the dimensions that have the least variability (or were otherwise identified as undesired). As such, a compressed k-d tree is created by removing the undesired dimensions from each descriptor of the stored descriptors. While only k descriptors are retained, the structure of the compressed k-d tree remains based on the j dimensions. At step 560, the k dimensions are stored for each descriptor, with the remaining dimensions that are part of j but not k, being discarded or stored elsewhere.

Following step 560, a query descriptor may be used to search the compressed k-d tree to locate an (approximate) match, such as in accordance with method 300 or method 400 of FIGS. 3 and 4, respectively.

In some embodiments, multiple k-d trees may be used instead of having one, larger k-d tree. Such a multiple k-d tree structure may involve either the use of multiple compressed k-d trees or multiple (uncompressed) k-d trees. Whether compressed or uncompressed, when multiple k-d trees are to be searched using a query descriptor, a first of the multiple k-d trees may be searched. If a match within a predefined amount of tolerance is identified, the search may conclude without other k-d trees of the multiple k-d trees being searched. If a match within a predefined amount of tolerance is not identified in the first of the multiple k-d trees, a second of the multiple k-d trees may be searched.

To generate the multiple k-d trees, a set of descriptors can be split or divided into several subgroups. Each subgroup may contain related descriptors, such as descriptors related to training images that are in a same category (e.g., images of cars). Each subgroup can have a k-d tree (which may be compressed) built using the descriptors linked with each training image of the subgroup—thereby resulting in the generation of multiple (compressed) k-d trees.

Through leveraging multiple compressed or uncompressed k-dimensional trees, computational advantages can be realized. First, finding the nearest neighbor in a smaller k-d tree may require a smaller number of backtrackings. As such, use of a smaller tree may translate into fewer distance calculations. Second, the accuracy of the matching procedure may not be affected by the possible overlaps that tend to occur in large databases. Third, early recognition of a match in visiting initial k-d trees can result in a faster return time of the match. For example, if a match (e.g., within a certain $L^2$ distance threshold) between a descriptor and a query descriptor is found in an early (compressed or uncompressed) k-d tree searched, other k-d trees may not need to be searched. In addition to these possible advantages, using multiple k-d trees also provides the flexibility to select a subset of a database of descriptors, either by a user or automatically by an algorithm to refine a search. For instance, if a user specifies the type of descriptors to be used, only k-d trees that correspond to the specified type of descriptors may need to be searched. For example, the user may specify "shrubs," as such, only k-d trees containing descriptors related to shrubs may be searched. In such embodiments, a vocabulary-based tree classification algorithm can be trained offline to select the k-d tree to be searched or for ordering the k-d trees that are going to be visited or for early query rejection when the query is not in any of the k-d trees.

Figure 6:
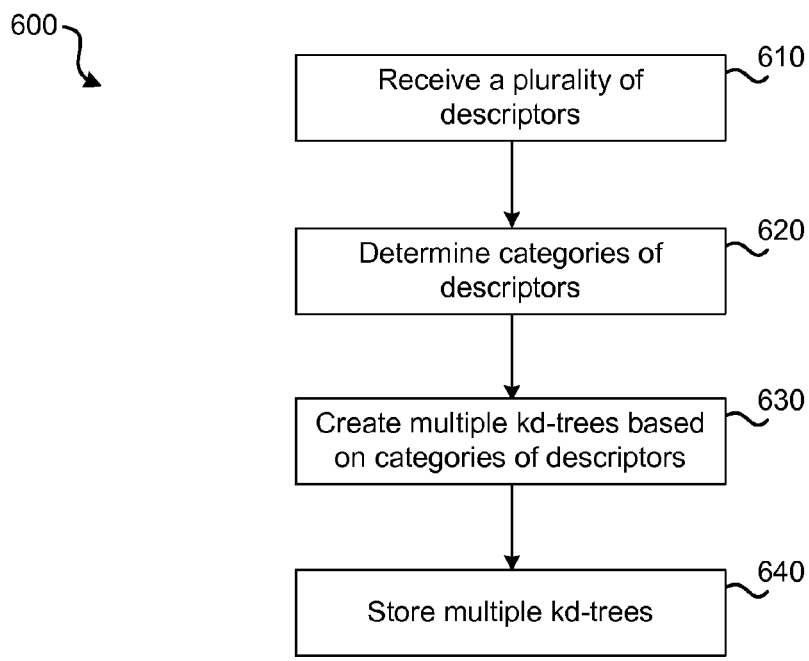
FIG. 6 illustrates an embodiment of a method for creating multiple k-dimensional trees.
Figure 7:
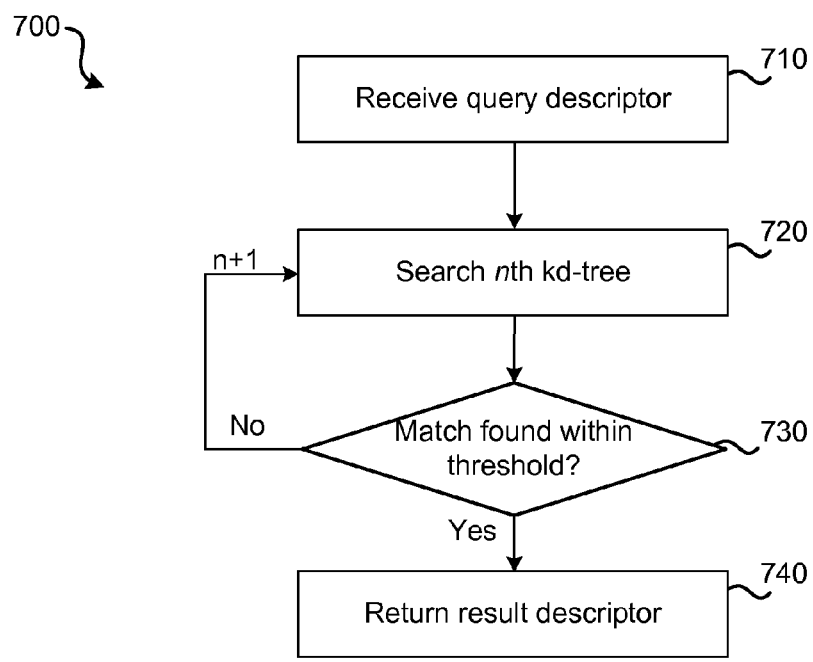
FIG. 7 illustrates an embodiment of a method for searching multiple k-dimensional trees.

Method 600 and method 700 of FIGS. 6 and 7, respectively, relate to the use of multiple k-d trees. Such methods may be used in conjunction with compressed or uncompressed k-d trees.

FIG. 6 illustrates an embodiment of a method 600 for creating multiple k-d trees. Method 600 may be performed by system 100. Method 600 may be performed by a computer system, such as search server 140 of FIG. 1. Method 600 may also be performed by some other type of device, such as a mobile device of mobile devices 110 or a computer system of computer systems 160. Some embodiments of method 600 are performed by systems other than system 100 of FIG. 1. At step 610, a plurality of descriptors that are to be organized into multiple k-d trees is received. In some embodiments, millions of descriptors may be received that are to be organized into multiple k-d trees. These descriptors may have been created from a plurality of training images. As such, rather than receiving the plurality of descriptors at step 610, a plurality of training images may be received. The plurality of descriptors may then be created from the plurality of training images.

At step 620, the descriptors may be organized into groups. The descriptors may be organized into groups based on properties of the training images used to create the descriptors. For example, all descriptors that were created from corporate logos may be stored as part of the same group. In some embodiments, descriptors from very different images can be placed in the same group. As such, an acceptable match may have a higher chance of being found during a search conducted within the k-d trees searched initially. In other embodiments, descriptors created from images belonging to a same category can be placed in the same group. In doing so, only a subset of the plurality of descriptors may need to be loaded in order to perform a search. As such, the total number of descriptors used for a search may be decreased. Such an advantage can be beneficial in certain applications, such as in GPS-related applications. In such applications, only descriptors created from images that relate to a particular region may need to be used for a search. According to some embodiments, descriptors can be clustered into groups based on, for example, the manner in which a "bag of words" model employs clustering. In doing so, after employing a "bag of words" model, it may only be necessary to load a single k-d tree. In some embodiments, no categories of the descriptors are determined.

At step 630, the multiple k-d trees are created based on the groups of descriptors, if any, of step 620. If the k-d trees created at step 630 are compressed, the k-d trees may be created according to method 300 of FIG. 3, method 400 of FIG. 4, or some other method for creating compressed k-d trees. If compressed k-d trees are created, each descriptor of each compressed k-d tree may have a fewer number of dimensions than the number of dimensions that were initially received at step 610. At step 640, the multiple k-d trees may be stored. An order may be assigned to the k-d trees such that a particular search order of k-d trees for descriptors is performed using received query descriptors. The first k-d trees search may be the k-d trees where a match within a tolerance distance is expected to be found.

FIG. 7 illustrates an embodiment of a method for searching multiple k-d trees. Method 700 may be used for searching multiple k-d trees as created using method 600 of FIG. 6 or some other method for creating multiple k-d trees. Method 700 may be performed by a computer system, such as search server 140 of FIG. 1. Method 700 may also be performed by some other computerized device, such as a mobile device of mobile devices 110 or a computer system of computer systems 160 of system 100, that can remotely access the stored descriptors of search server 140. Besides system 100 of FIG. 1, other systems may be used to perform method 700.

At step 710, a query descriptor may be received. The query descriptor may be created based on a captured image, such as an image captured by mobile device 110-1 of FIG. 1. In some embodiments, rather than receiving a query descriptor, the captured image is received. The query descriptor may be created using the captured image. In some embodiments, the captured image may be captured by an image capture device, such as image capture device 112 of mobile device 110-1. The query descriptor may be created from the captured image locally by mobile device 110-1. In some embodiments, the captured image may be transmitted to a remote server, such as search server 140; search server 140 may then create the query descriptor from the captured image. As such, if the search is being performed by a search server, the search server may either receive the query descriptor or may receive a captured image to be used to create the query descriptor. The query descriptor received at step 710 may be received as part of an indication configured to initiate a search.

The query descriptor may be used to search a first k-d tree at step 720. The first k-d tree searched may be selected based on a predefined order of k-d trees to be searched. The first k-d tree to be searched may also be selected based on factors such as: a GPS-location of the device that captured the image, a category selected by a user, or a category selected automatically.

If, at step 730, a match is found (e.g., the $L^2$ distance between the nearest descriptor and the query descriptor is below a certain threshold distance), the resulting descriptor may be returned as the result at step 740. If a match is not found, the next k-d tree, in this instance, the second k-d tree, may be searched at step 720. Steps 720 and 730 may repeat until either a match is found or all of the k-d trees have been exhausted with no match being found. The result descriptor returned at step 740 may be returned as the result. In some embodiments, the training image linked with the result descriptor may be returned as the result. In some embodiments, instead of the training image, or in addition to the training image, a set of stored data linked with the result descriptor may be returned.

Figure 8:
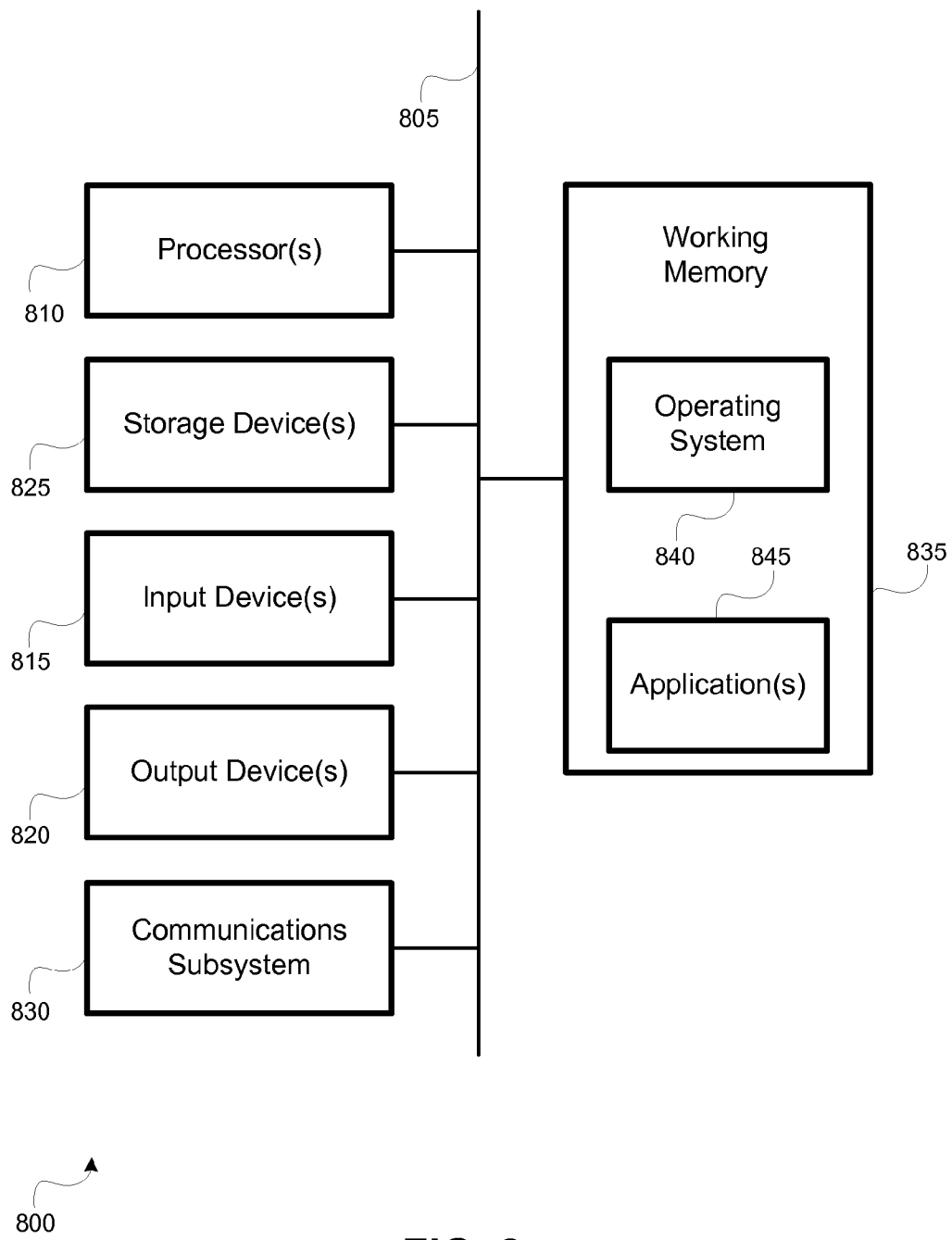
FIG. 8 illustrates an embodiment of a computer system.

A computer system as illustrated in FIG. 8 may be incorporated as part of the previously described computerized devices. For example, computer system 800 can represent some of the components of the mobile devices, computer systems, and/or the servers discussed in this application. FIG. 8 provides a schematic illustration of one embodiment of a computer system 800 that can perform the methods provided by various other embodiments, as described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory tangible storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for using k-dimensional trees for a search, the method comprising:
   storing a first plurality of descriptors, wherein each of the first plurality of descriptors stored is linked with a first number of stored dimensions;
   searching, by a computer system, a first k-dimensional tree with a query descriptor for a matching descriptor from among the first plurality of descriptors linked with the first number of stored dimensions, wherein:
      the first k-dimensional tree is built using the first plurality of descriptors wherein each of the first plurality of descriptors is linked with a second number of dimensions when the first k-dimensional tree is built; and
      the second number of dimensions is a greater number of dimensions than the first number of stored dimensions;
   storing, by the computer system, a second plurality of descriptors, wherein each of the second plurality of descriptors stored is linked with the first number of stored dimensions; and
   following searching the first k-dimensional tree, searching, by the computer system, a second k-dimensional tree using the query descriptor to find the matching descriptor from among the second plurality of descriptors linked with the first number of stored dimensions, wherein
      the second k-dimensional tree is built using the second plurality of descriptors wherein each of the second plurality of descriptors is linked with the second number of dimensions when the second k-dimensional tree is built.

2. The method for using k-dimensional trees for the search of claim 1, further comprising:
   building the first k-dimensional tree using the first plurality of descriptors, wherein:
      each of the first plurality of descriptors is linked with the second number of dimensions when the first k-dimensional tree is built; and
   the first plurality of descriptors are at least partially based on image data.

3. The method for using k-dimensional trees for the search of claim 2, wherein:
   each dimension stored as part of the first number of stored dimensions matches a dimension of the second number of dimensions used to build the first k-dimensional tree.

4. The method for using k-dimensional trees for the search of claim 2, wherein:
   each dimensions stored as part of the first number of stored dimensions is compressed using a PCA sub-space projection.

5. The method for using k-dimensional trees for the search of claim 1, further comprising:
   determining the query descriptor based on a query image.

6. The method for using k-dimensional trees for the search of claim 5, further comprising:
   identifying one or more images that at least approximately match the query image based at least in part on the search using the second k-dimensional tree.

7. The method for using k-dimensional trees for the search of claim 1, wherein searching the second k-dimensional tree is performed because the matching descriptor was not located when searching the first k-dimensional tree.

8. A computer-readable medium comprising instructions configured to cause a computer to:
   store a first plurality of descriptors, wherein each of the first plurality of descriptors stored is linked with a first number of stored dimensions;
   search a first k-dimensional tree with a query descriptor for a matching descriptor from among the first plurality of descriptors linked with the first number of stored dimensions, wherein:
      the first k-dimensional tree is built using the first plurality of descriptors wherein each of the first plurality of descriptors is linked with a second number of dimensions when the first k-dimensional tree is built; and
      the second number of dimensions is a greater number of dimensions than the first number of stored dimensions;
   store a second plurality of descriptors, wherein each of the second plurality of descriptors stored is linked with the first number of stored dimensions; and
   following searching the first k-dimensional tree, search a second k-dimensional tree using the query descriptor to find the matching descriptor from among the second plurality of descriptors linked with the first number of stored dimensions, wherein
      the second k-dimensional tree is built using the second plurality of descriptors wherein each of the second plurality of descriptors is linked with the second number of dimensions when the second k-dimensional tree is built.

9. The computer-readable medium of claim 8, wherein the instructions are further configured to cause the computer to:
   build the first k-dimensional tree using the first plurality of descriptors, wherein:

each of the first plurality of descriptors is linked with the second number of dimensions when the first k-dimensional tree is built; and the first plurality of descriptors are at least partially based on image data.

10. The computer-readable medium of claim 9, wherein each dimension stored as part of the first number of stored dimensions matches a dimension of the second number of dimensions used to build the first k-dimensional tree.

11. The computer-readable medium of claim 8, wherein the instructions are further configured to cause the computer to: determine the query descriptor based on a query image.

12. The computer-readable medium of claim 11, wherein the instructions are further configured to cause the computer to:

identify one or more images that at least approximately match the query image based at least in part on searching the second k-dimensional tree.

13. The computer-readable medium of claim 8, wherein searching the second k-dimensional tree is performed because the matching descriptor was not located when searching the first k-dimensional tree.

14. A system for using k-dimensional trees for a search, the system comprising:
a processor; and
a first memory communicatively coupled with and readable by the processor having stored therein a series of processor-readable instructions which, when executed by the processor, cause the processor to:
cause a first plurality of descriptors to be stored, wherein each of the first plurality of descriptors stored is linked with a first number of stored dimensions;
search a first k-dimensional tree with a query descriptor for a matching descriptor from among the first plurality of descriptors linked with the first number of stored dimensions, wherein:
the first k-dimensional tree is built using the first plurality of descriptors wherein each of the first plurality of descriptors is linked with a second number of dimensions when the first k-dimensional tree is built; and
the second number of dimensions is a greater number of dimensions than the first number of stored dimensions;
cause a second plurality of descriptors to be stored, wherein each of the second plurality of descriptors stored is linked with the first number of stored dimensions; and
following searching the first k-dimensional tree, search a second k-dimensional tree using the query descriptor to find the matching descriptor from among the second plurality of descriptors linked with the first number of stored dimensions, wherein
the second k-dimensional tree is built using the second plurality of descriptors wherein each of the second plurality of descriptors is linked with the second number of dimensions when the second k-dimensional tree is built.

15. The system for using k-dimensional trees for the search of claim 14, wherein the series of processor-readable instructions is further configured to cause the processor to:
build the first k-dimensional tree using the first plurality of descriptors, wherein:
each of the first plurality of descriptors is linked with the second number of dimensions when the first k-dimensional tree is built; and
the first plurality of descriptors are at least partially based on image data.

16. The system for using k-dimensional trees for the search of claim 15, wherein
each dimension stored as part of the first number of stored dimensions matches a dimension of the second number of dimensions used to build the first k-dimensional tree.

17. The system for using k-dimensional trees for the search of claim 15, wherein the processor and the memory are part of a computer server system.

18. The system for using k-dimensional trees for the search of claim 15, wherein the processor and the memory are part of a mobile device.

19. The system for using k-dimensional trees for the search of claim 15, wherein the system further comprises an interface configured to receive an indication to perform an image search.

20. The system for using k-dimensional trees for the search of claim 19, wherein the indication comprises the query descriptor.

21. The system for using k-dimensional trees for the search of claim 19, wherein the indication comprises a query image.

22. The system for using k-dimensional trees for the search of claim 21, wherein the series of processor-readable instructions is further configured to cause the processor to:
determine the query descriptor based on a query image captured using a mobile device.

23. The system for using k-dimensional trees for the search of claim 22, wherein the series of processor-readable instructions is further configured to cause the processor to:
identify an image that at least approximately matches the query image based at least in part on searching the second k-dimensional tree.

24. The system for using k-dimensional trees for the search of claim 14, wherein searching the second k-dimensional tree is performed because the matching descriptor was not located when searching the k-dimensional tree.

25. An apparatus for using k-dimensional trees for a search, the apparatus comprising:
means for storing a first plurality of descriptors, wherein each of the first plurality of descriptors stored is linked with a first number of stored dimensions and the means for storing the first plurality of descriptors comprises a non-transitory computer-readable storage medium;
means for searching a first k-dimensional tree with a query descriptor for a matching descriptor from among the first plurality of descriptors linked with the first number of stored dimensions, wherein:
the first k-dimensional tree is built using the first plurality of descriptors wherein each of the first plurality of descriptors is linked with a second number of dimensions when the first k-dimensional tree is built;
the second number of dimensions is a greater number of dimensions than the first number of stored dimensions, and
the means for searching the first k-dimensional tree comprises a processor,
means for storing a second plurality of descriptors, wherein each of the second plurality of descriptors stored is linked with the first number of stored dimensions; and
means for searching a second k-dimensional tree using the query descriptor to find the matching descriptor from among the second plurality of descriptors linked with the first number of stored dimensions, such searching occurring after searching the first k-dimensional tree wherein
the second k-dimensional tree is built using the second plurality of descriptors wherein each of the second plurality of descriptors is linked with the second number of dimensions when the second k-dimensional tree is built.

26. The apparatus for using k-dimensional trees for the search of claim 25, further comprising:
means for building the first k-dimensional tree using the first plurality of descriptors, wherein:
each of the first plurality of descriptors is linked with the second number of dimensions when the first k-dimensional tree is built; and
the first plurality of descriptors are at least partially based on image data.

27. The apparatus for using k-dimensional trees for the search of claim 26, wherein:
each dimension stored as part of the first number of stored dimensions matches a dimension of the second number of dimensions used to build the first k-dimensional tree.

28. The apparatus for using k-dimensional trees for the search of claim 25, further comprising:
means for determining the query descriptor based on a query image.

29. The apparatus for using k-dimensional trees for the search of claim 28, further comprising:
means for identifying one or more images that at least approximately match the query image based at least in part on searching the second k-dimensional tree.

30. The apparatus for using k-dimensional trees for the search of claim 25, wherein the means for searching the second k-dimensional tree is used because the matching descriptor was not located when searching the first k-dimensional tree.

31. A system for using k-dimensional trees for a search, the system comprising:
a mobile device that comprises an image capture device, the mobile device configured to:
capture a query image;
create a query descriptor using the query image; and
transmit the query descriptor to a computer system; and
the computer system comprising a computer-readable medium comprising instructions configured to cause a computer to:
receive the query descriptor from the mobile device;
cause a first plurality of descriptors to be stored, wherein each of the first plurality of descriptors stored is linked with a first number of stored dimensions;
search a first k-dimensional tree with the query descriptor to find a matching descriptor from among the plurality of descriptors linked with the first number of stored dimensions, wherein:
the first k-dimensional tree is built using the plurality of descriptors wherein each of the plurality of descriptors is linked with a second number of dimensions when the first k-dimensional tree is built; and
the second number of dimensions is a greater number of dimensions than the first number of stored dimensions;
cause a second plurality of descriptors to be stored, wherein each of the second plurality of descriptors stored is linked with the first number of stored dimensions; and
following searching the first k-dimensional tree, search a second k-dimensional tree using the query descriptor to find the matching descriptor from among the second plurality of descriptors linked with the first number of stored dimensions, wherein
the second k-dimensional tree is built using the second plurality of descriptors wherein each of the second plurality of descriptors is linked with the second number of dimensions when the second k-dimensional tree is built.

* * * * *